United States Patent
Pickett et al.

(10) Patent No.: US 9,357,712 B2
(45) Date of Patent: Jun. 7, 2016

(54) POLE-ATTACHED POWER TOOL SYSTEMS

(71) Applicant: BLOUNT, INC., Portland, OR (US)

(72) Inventors: Evan Pickett, Tigard, OR (US); Edgar A. Dallas, Beaverton, OR (US)

(73) Assignee: Blount, Inc., Portland, OR (US)

(*) Notice: Subject to any disclaimer, the term of this patent is extended or adjusted under 35 U.S.C. 154(b) by 0 days.

(21) Appl. No.: 14/071,537

(22) Filed: Nov. 4, 2013

(65) Prior Publication Data

US 2015/0068050 A1 Mar. 12, 2015

Related U.S. Application Data

(63) Continuation of application No. 14/020,721, filed on Sep. 6, 2013.

(51) Int. Cl.
| | |
|---|---|
| A01G 3/08 | (2006.01) |
| B25F 5/02 | (2006.01) |
| B25G 1/04 | (2006.01) |
| B27B 17/00 | (2006.01) |

(52) U.S. Cl.
CPC . A01G 3/085 (2013.01); B25F 5/02 (2013.01); B25G 1/04 (2013.01); B27B 17/0008 (2013.01)

(58) Field of Classification Search
CPC ............. A01G 3/085; B25F 5/02; B25G 1/04
USPC ................. 30/166, 216, 296.1, 381, 392, 517
See application file for complete search history.

(56) References Cited

U.S. PATENT DOCUMENTS

| | | | | |
|---|---|---|---|---|
| 3,657,813 | A | * | 4/1972 | Knight ............................. 30/373 |
| 4,207,675 | A | * | 6/1980 | Causey et al. ................ 30/296.1 |
| 4,400,028 | A |  | 8/1983 | Conrad |
| 4,654,971 | A | * | 4/1987 | Fettes et al. ...................... 30/383 |
| 4,911,039 | A | * | 3/1990 | Lubbock et al. ............... 81/53.1 |
| 4,924,573 | A | * | 5/1990 | Huddleston et al. ......... 30/272.1 |
| 5,013,282 | A | * | 5/1991 | Keller ............................ 464/172 |
| 5,261,162 | A | * | 11/1993 | Siegler ............................ 30/216 |
| 5,718,050 | A | * | 2/1998 | Keller et al. ................. 30/123.4 |
| 5,926,961 | A | * | 7/1999 | Uhl .............................. 30/296.1 |
| 6,182,367 | B1 | * | 2/2001 | Janczak ........................... 30/392 |
| 6,345,445 | B1 | * | 2/2002 | Schofield ........................ 30/249 |
| 6,588,065 | B1 | * | 7/2003 | Tucker, III ...................... 16/429 |
| 6,651,347 | B2 | * | 11/2003 | Uhl .................................. 30/383 |
| 6,735,873 | B2 | * | 5/2004 | Langhans et al. ............... 30/216 |
| 7,484,300 | B2 | * | 2/2009 | King et al. ................... 30/296.1 |
| 7,752,760 | B2 | * | 7/2010 | Baskar et al. ................... 30/517 |
| 7,930,833 | B2 | * | 4/2011 | Baskar et al. ................... 30/517 |

(Continued)

FOREIGN PATENT DOCUMENTS

| | | |
|---|---|---|
| CN | 101273694 A | 10/2008 |
| CN | 102421569 A | 4/2012 |
| CN | 202489891 U | 10/2012 |

*Primary Examiner* — Hwei C Payer
(74) *Attorney, Agent, or Firm* — Schwabe Williamson & Wyatt

(57) ABSTRACT

Embodiments of a pole-attached power tool system, and related methods, are disclosed herein. In some embodiments, a pole-attached power tool system may include a pole having a first end, a second end, and an interior region; a handle disposed proximate to the first end of the pole; an electric motor disposed proximate to the first end of the pole; a power tool disposed proximate to the second end of the pole; and a drive member disposed within the interior region, the drive member mechanically coupled with the electric motor and the power tool to transfer power generated by the electric motor to the power tool.

21 Claims, 5 Drawing Sheets

(56) References Cited

U.S. PATENT DOCUMENTS

| | | | |
|---|---|---|---|
| 8,020,304 B2* | 9/2011 | Mace et al. | 30/381 |
| 8,191,268 B2* | 6/2012 | Willetts | 30/392 |
| 8,882,166 B2* | 11/2014 | Ramsey et al. | 294/210 |
| 2009/0119933 A1 | 5/2009 | Mace et al. | |
| 2010/0218386 A1* | 9/2010 | Ro kamp et al. | 30/277.4 |
| 2011/0232436 A1* | 9/2011 | Morabit | 83/13 |

* cited by examiner

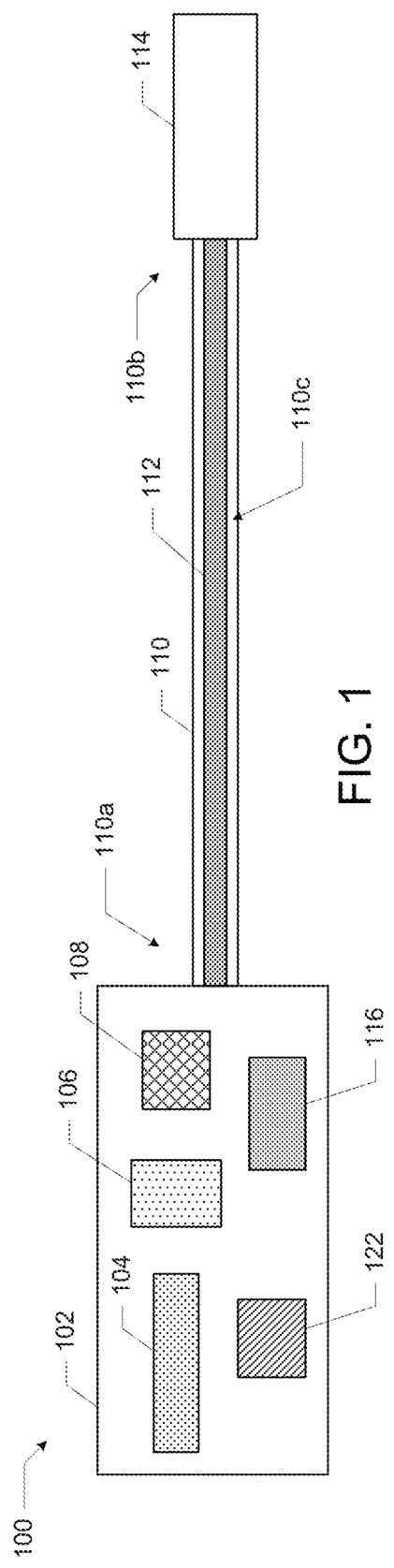

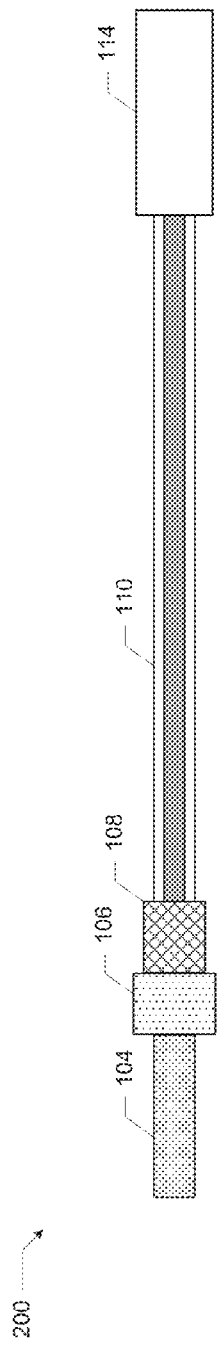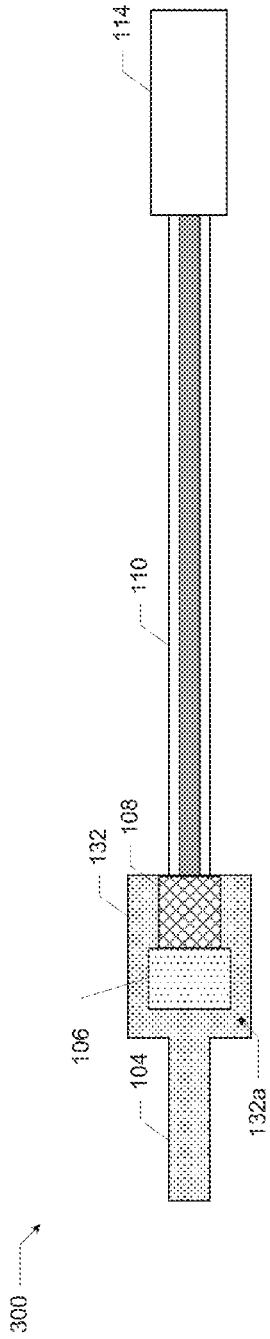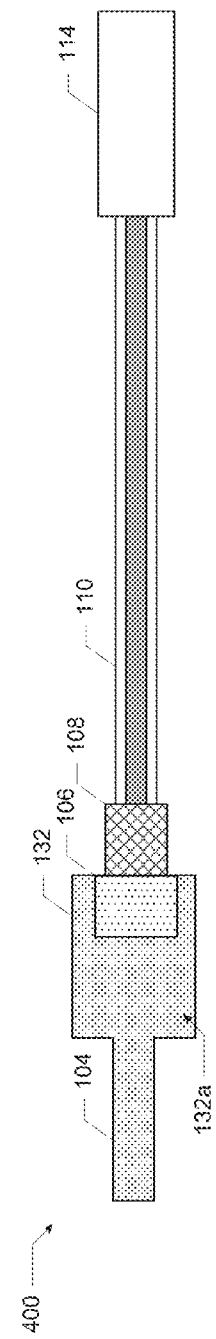

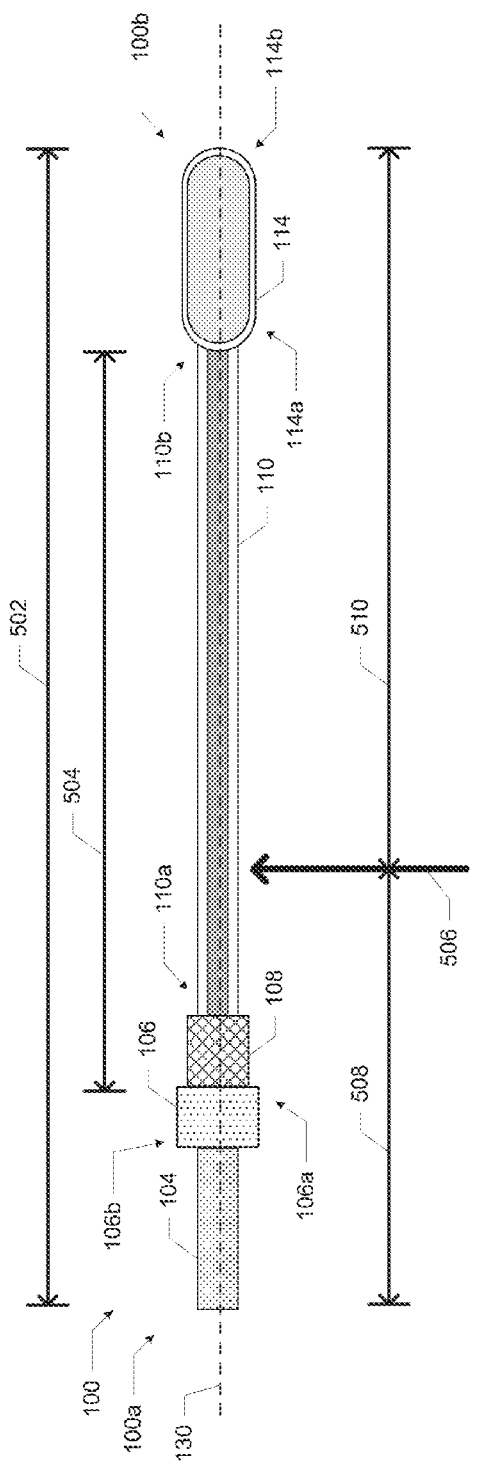
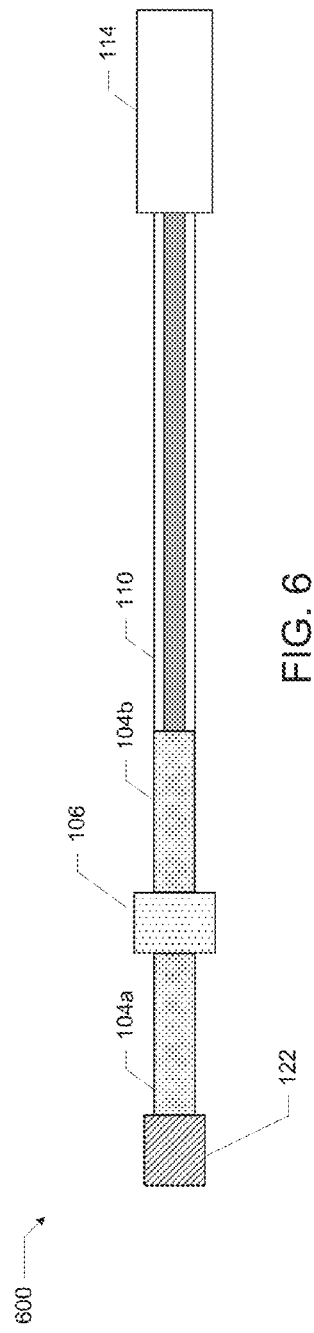

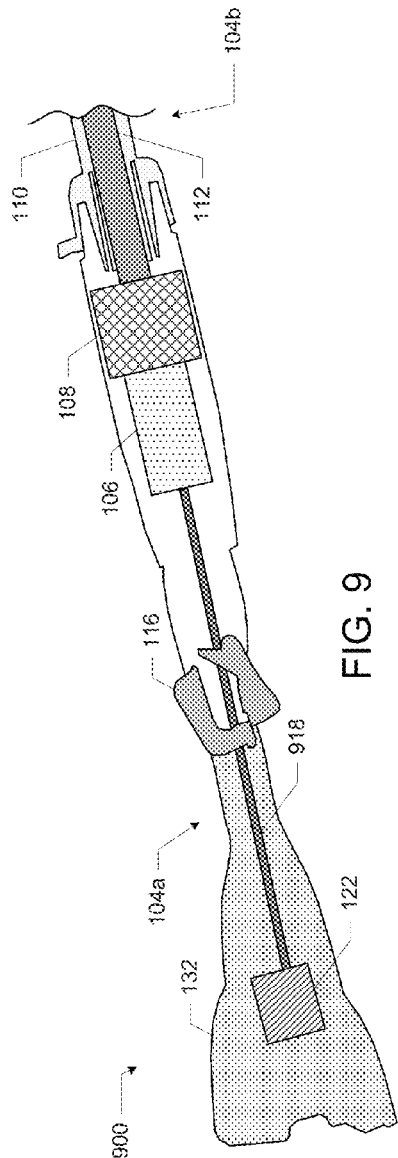
FIG. 9
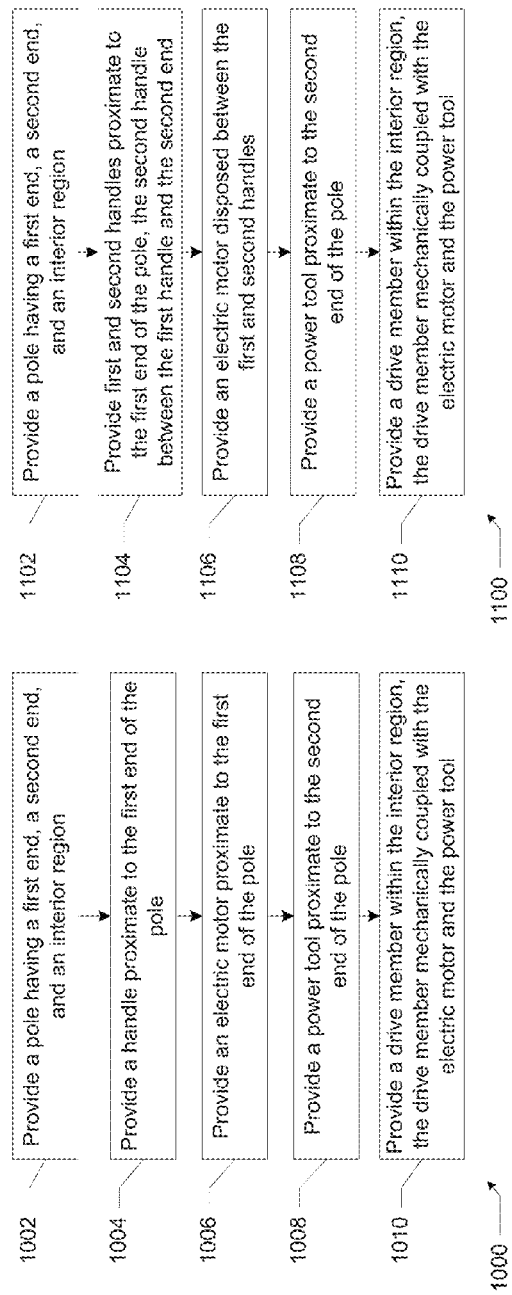
FIG. 10
FIG. 11

POLE-ATTACHED POWER TOOL SYSTEMS

CROSS REFERENCE TO RELATED APPLICATION

The present application is a continuation of and claims priority to U.S. patent application Ser. No. 14/020,721, which was filed on 6 Sep. 2013, titled "POLE-ATTACHED POWER TOOL SYSTEMS." The entire disclosure is incorporated herein by reference.

TECHNICAL FIELD

The present disclosure relates generally to the field of power tools, and more particularly, to pole-attached power tool systems.

BACKGROUND

Pole-attached power tools may be used to effectively extend a user's reach and allow a user to work in hard-to-access environments. These tools may be unwieldy or difficult for a user to operate due to the length of the pole, the weight and limited power of the gasoline engine or electric motor used to power the tool, and the environment in which the tool is to be used, among other factors.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 is a schematic illustration of a pole-attached power tool system, in accordance with various embodiments.

FIGS. 2-4 are schematic illustrations of various embodiments of the pole-attached power tool system of FIG. 1.

FIG. 5 depicts illustrative dimensions and a center of gravity of an embodiment of the pole-attached power tool system of FIG. 1.

FIG. 6 is a schematic illustration of an embodiment of the pole-attached power tool system of FIG. 1.

FIG. 9 is a cross-sectional illustration of a portion of an embodiment of the pole-attached power tool system of FIG. 1.

FIGS. 10-11 are flow diagrams illustrating processes for manufacturing a pole-attached power tool system, in accordance with some embodiments.

DETAILED DESCRIPTION

Figure 7:
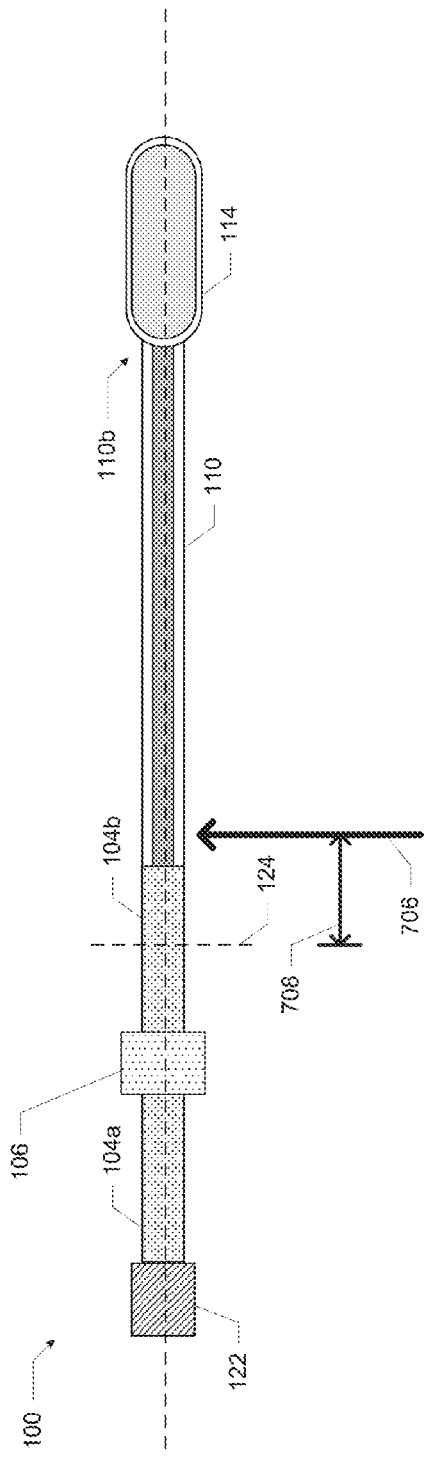
FIGS. 7-8 depict illustrative dimensions and centers of gravity of an embodiment of the pole-attached power tool system of FIG. 1 in various configurations.

Embodiments of a pole-attached power tool system, and related methods, are disclosed herein. In some embodiments, a pole-attached power tool system may include a pole having a first end, a second end, and an interior region; a handle disposed proximate to the first end of the pole; an electric motor disposed proximate to the first end of the pole; a power tool disposed proximate to the second end of the pole; and a drive member disposed within the interior region, the drive member mechanically coupled with the electric motor and the power tool to transfer power generated by the electric motor to the power tool.

In the following detailed description, reference is made to the accompanying drawings which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the disclosed embodiments. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

FIG. 1 is a schematic illustration of a pole-attached power tool system 100, in accordance with various embodiments. The system 100 may include a motor/handle arrangement 102, a pole 110 and a power tool 114.

The pole 110 may have a first end 110a, a second end 110b, and an interior region 110c. In some embodiments, the pole 110 may be hollow and shaped substantially as a cylinder, although other cross-sectional shapes may be used, such as oval, square, rectangular, etc. The pole 110 may be formed from any of a number of materials, to achieve a desired weight and strength. Examples of materials that may be used for the pole 110 include aluminum, fiberglass, other metals, or any combination of materials. In some embodiments, the pole 110 may have a length of at least 2 feet. In preferred embodiments, the pole 110 may have a length of at least 3, 5, 7, 9, 11 or 13 feet. In some embodiments, the pole 110 may be reversibly extendable. For example, the pole 110 may telescope. In embodiments in which the pole 110 is reversibly extendable, the above values for the length of the pole 110 may be applied to any extended or retracted state of the pole 110. The pole 110 need not be formed from a single member, but may include multiple members (e.g., multiple members in a telescoping configuration).

The motor/handle arrangement 102 may be disposed proximate to the first end 110a of the pole 110. The motor/handle arrangement 102 may include a handle 104, an electric motor 106, a gear box 108, a battery 122, and a switch 116.

The handle 104 may be configured and positioned to be gripped by a user while the system 100 is in use. Although the handle 104 is described in the singular, the system 100 may include two or more handles in various embodiments. The handle 104 may be shaped in any manner suitable for gripping by a user. In some embodiments, the handle 104 may include a harness or shoulder strap. In some embodiments, the handle 104 may include multiple regions configured to be gripped by a user. The handle 104 may be formed from any of a number of materials, such as plastics, polymers, metals, or combinations of materials. In some embodiments, the handle 104 may be injection molded. In some embodiments, the handle 104 may be formed in a handle housing (not shown), which may include an interior region in which one or more components may be disposed. A handle housing may include one or more regions which may serve as the handle 104; these regions may be dimensioned to be gripped by a user, and may include additional material to improve a user's grip (such as a rubber or synthetic material provided with ridges or finger rests).

The motor/handle arrangement 102 may include an electric motor 106. In some embodiments, the electric motor 106 may be a DC motor. In some embodiments, the electric motor 106 may be an AC motor. In some embodiments, the electric motor 106 may be disposed in the interior region of a handle housing. Electric motors (such as the electric motor 106) may have a number of advantages over gas engines (typically used in many power tool applications). For example, gas engines require the user to provide liquid fuel (e.g., gasoline), which may be difficult to store and transport to remote locations. Gas engines are often louder than electric motors, and generate exhaust and other fumes. Gas engines are also typically heavier than electric motors, making it more difficult for a user to carefully control a gas-based tool and causing additional fatigue. However, when compared to electric motors of the same volume, gas engines typically provide more power. Thus, many existing pole-attached tool systems have utilized gas engines instead of electric motors to achieve greater power.

In the system 100, the electric motor 106 may be disposed proximate to the first end 110a of the pole 110. This positioning of the electric motor 106 represents a divergence from existing approaches to the design of electric pole-attached tool systems. Because such electric motor configurations typically provide less power than their fuel-based counterparts (as discussed above), existing electric pole-attached tool systems have been designed to maximize the efficiency of power transfer between the electric motor and the power tool. To this end, existing electric pole-attached tool systems have positioned the electric motor close to the power tool to minimize losses due to additional length and complexity of the drivetrain between the electric motor and the power tool. Consequently, existing systems position the electric motor far away from the handle 104 and the user. Moreover, because the electric motor is typically positioned far away from the user of an electric pole-attached tool system, designers have traditionally attempted to minimize the weight of the electric motor to reduce the torque experienced by the user and make the system easier to control. The result of this traditional approach has been electric pole-attached tool systems with relatively small electric motors positioned close to the power tool at the "far" end of the pole. This traditional approach has been reinforced by the use of electric string trimmer platforms (in which the electric motor is located close to the trimming string) as the basis for the development of pole-attached power tools.

The alternative approach disclosed herein represents a rejection of the traditional model, and a reconsideration and balancing of design factors in a novel way. For example, although more powerful electric motors typically weigh more than less powerful motors (and in cordless variants, require heavier and more powerful batteries), the additional weight of such a motor may not be problematic for a user if the weight is positioned in the pole-attached tool system in a suitable location. Indeed, not only may additional weight not be problematic, it may advantageously improve a user's ability to control the system if the weight contributes to the balance and stability of the system. Moreover, it may be less important to maximize drivetrain efficiency when a more powerful electric motor is used because drivetrain losses may have a relatively smaller impact on overall performance.

Thus, in various embodiments of the electric pole-attached tool system 100, the electric motor 106 (and/or its accompanying battery) may be larger and heavier than those used in existing electric pole-attached tool systems, and may include a lossier drivetrain, while improving both power tool performance and handleability. In particular, as discussed below with reference to FIG. 5, the center of gravity of the system 100 may be closer to the handle 104 than in existing electric pole-attached tool systems, which may make it easier for the user to carry and control the system 100 than existing systems. In some embodiments, a more powerful electric motor may be used as the electric motor 106 than was previously achievable, which may allow the system 100 to achieve better power performance than existing electric pole-attached tool systems (and approaching, comparable to, or exceeding the power performance of gas-powered pole-attached tool systems). In some embodiments, the system 100 may weigh between 10 and 20 pounds. In preferred embodiments, the system 100 may weigh between 10 and 15 pounds. Longer and more complex drivetrains may also be used. Additionally, positioning the electric motor 106 proximate to the first end 110a of the pole 110 allows the system 100 to achieve a smaller form factor at the end of the system 100 closest to the power tool 114. This may make it easier for users to negotiate the system 100 in tight spaces (e.g., between tree branches), and for the user to be able to clearly see and position the power tool 114.

The motor/handle arrangement 102 may include a battery 122, which may be electrically coupled to the electric motor 106. The battery 122 may be a rechargeable battery, and may be removably coupled with a charger (not shown) to recharge. In some embodiments, the battery 122 may be a Lithium ion battery or a NiCad battery. The voltage provided by the battery 122 may be any suitable voltage (e.g., 20 volts). The amperage provided by the battery 122 may be any suitable amperage (e.g., 4 ampere-hours). In some embodiments, the battery 122 may provide at least 20 ampere-hours of power at 40 volts.

In some embodiments, the system 100 may include an electrical cable (not shown) to couple the electric motor 106 to an energy source, such as an AC wall outlet (instead of or in addition to the battery 122). The length of the cable may vary depending on the environment in which the system 100 is to be used; in some embodiments, the cable may have a length of 100 feet or more.

In some embodiments, because the power tool 114 may be driven by the electric motor 106, the system 100 may not include a liquid fuel tank and/or an engine that operates on liquid fuel (such as a gas motor).

The motor/handle arrangement 102 may include a switch 116. The switch 116 may be electrically coupled to the electric motor 106, and may be disposed proximate to the electric motor 106. The switch 116 may be operable by a user of the system 100 to control actuation of the power tool 114. In some embodiments, the switch 116 may include one or more controls operable by a user. For example, the switch 116 may include a ready/off switch, a trigger operable to commence actuation of the power tool 114, and/or one or more dials to adjust performance characteristics of the system 100.

The motor/handle arrangement 102 may include a gear box 108. The gear box 108 may include one or more cams, gears, or shafts mechanically coupled to the electric motor 106 and to the power tool 114 to convert the motor power into actuation of the power tool 114. In some embodiments, the motor/handle arrangement 102 may not include the gear box 108; instead, the gear box 108 may be disposed in a different location (e.g., proximate to the second end 110b of the pole 110) or not included in the system 100. In alternative embodiments, a gear box 108 may be replaced by a direct drive flexible cable, or other such arrangement.

As noted above, the pole 110 may have an interior region 110c. A drive member 112 may be disposed within the interior region 110c. The drive member 112 may be mechanically coupled with the electric motor 106 and the power tool 114 to transfer power generated by the electric motor 106 to the power tool 114 to actuate the power tool 114. In some embodiments, the drive member 112 may include a chain drive. In some embodiments, the drive member 112 may include a belt drive. In some embodiments, the drive member may have a length greater than 20 inches. In some embodiments, the drive member may have a length greater than 40 inches. In some embodiments, the drive member 112 may include any suitable drive technology employed in existing gas or electric pole-attached tool systems. As the length and complexity of drive member 112 increases, a battery 122 with greater power may be desirable.

The power tool 114 may be disposed proximate to the second end 110b of the pole 110. The power tool 114 may include any suitable power tool. In some embodiments, the power tool 114 may include a saw. The saw may be a chain saw, which may include a bar and a chain with teeth (e.g., a ¼ inch or ⅜ inch chain). The cutting dimensions of the saw may be 6 inches, 8, inches, 10 inches, 12 inches, or 14 inches, for example. In other examples, the power tool 114 may be a hedge trimmer, shaker, clipper, a rotating brush (e.g., to clean or remove moss or other debris), a drilling device, a pruner, a vibrating scraper, or other such tool.

FIGS. 2-4 are schematic illustrations of various embodiments of the pole-attached power tool system 100 of FIG. 1. The pole-attached power tool systems depicted in FIGS. 2-4 may include any of the components discussed above with reference to the system 100 (FIG. 1). For ease of illustration, only a small number of such components are shown in FIGS. 2-4.

In FIG. 2, the pole-attached power tool system 200 may include the handle 104, the electric motor 106, and the gear box 108, each disposed proximate to the first end 110a of the pole 110. The power tool 114 may be disposed proximate to the second end 110b of the pole 110. As shown, the electric motor 106 may be disposed between the handle 104 and the gear box 108. The gear box 108 may be disposed closest to the power tool 114 of any of the handle 104, the gear box 108, and the electric motor 106. In some embodiments, the gear box 108 may not be included.

In FIG. 3, the pole-attached power tool system 300 may include the handle 104, the electric motor 106, and the gear box 108, each disposed proximate to the first end 110a of the pole 110. The power tool 114 may be disposed proximate to the second end 110b of the pole 110. As shown, the electric motor 106 and the gear box 108 may be disposed in an interior region 132a of a handle housing 132. In some embodiments, the gear box 108 may not be included.

In FIG. 4, the pole-attached power tool system 400 may include the handle 104, the electric motor 106, and the gear box 108, each disposed proximate to the first end 110a of the pole 110. The power tool 114 may be disposed proximate to the second end 110b of the pole 110. As shown, the electric motor 106 may be disposed in the interior region 132a of the handle housing 132. The gear box 108 may be disposed between the handle 104 and the power tool 114. In some embodiments, the gear box 108 may not be included.

FIG. 5 depicts illustrative dimensions and center of gravity of an embodiment of the pole-attached power tool system 100 (FIG. 1). In FIG. 5, the system 100 may include the handle 104, the electric motor 106, and the gear box 108, each disposed proximate to the first end 110a of the pole 110. The power tool 114 may be disposed proximate to the second end 110b of the pole 110.

The center of gravity of the system 100, which generally represents the location in a particular direction of the average position of the weight or mass of the system 100, is represented by the arrow 506. In general, the center of gravity of the system 100 in the direction of the longitudinal axis 130, cg, may be calculated in accordance with:

$$cg = \frac{\int x\rho(x)dx}{\int \rho(x)dx}, \quad (1)$$

where $\rho(x)$ represents the density of the system 100 as a function of the position x along the longitudinal axis 130. As shown, in some embodiments, the center of gravity 506 may be located between the electric motor 106 and the power tool 114. In some embodiments, the center of gravity 506 may be located between the gear box 108 and the power tool 114. In some embodiments, both the electric motor 106 and the gear box 108 may be located on one side of the center of gravity 506 (along the longitudinal axis 130) and the power tool 114 may be located on the other side of the center of gravity 506.

The system 100 may have a first end 100a proximate to the first end 110a of the pole 110, and a second end 100b proximate to the second end 110b of the pole 110. The system 100 may have a longitudinal length 502 measured between the first end 100a and the second end 100b parallel to the longitudinal axis 130 of the pole 110. The center of gravity 506 may be located a distance 508 from the first end 100a of the system 100, and a distance 510 from the second end 100b of the system 100.

In some embodiments, the center of gravity 506 may be located less than approximately ½ of the longitudinal length 502 from the first end 100a; in other words, the ratio between the distance 508 and the longitudinal length 502 may be less than approximately ½. In preferred embodiments, the center of gravity may be located less than approximately ⅖, ³⁄₁₀, ⁷⁄₂₀, or ¹³⁄₄₀ of the longitudinal length 502 from the first end 100a.

The power tool 114 may have an end 114a and an end 114b. The end 114a of the power tool 114 may be closer to the first end 110a of the pole 110 than the end 114b is to the first end 110a of the pole 110. The electric motor 106 may have an end 106a and an end 106b. The end 106a of the electric motor 106 may be closer to the second end 110b of the pole 110 than the end 106b is to the second end 110b of the pole 110. The system 100 may have a dimension 504, measured between the end 114a of the power tool 114 and the end 106a of the electric motor 106. In some embodiments, the dimension 504 may be greater than approximately 12 inches. In preferred embodiments, the dimension 504 may be greater than approximately 20, 30, 40, 50 or 60 inches. In embodiments in which the pole 110 is reversibly extendable, the dimension 504 may change as the pole 110 is extended and retracted. In such embodiments, the above values for the dimension 504 may be applied to any extended or retracted state of the pole 110 (e.g., the configurations depicted in FIGS. 7-8 and discussed below).

FIG. 6 is a schematic illustration of an embodiment of the pole-attached power tool system 100 of FIG. 1. The pole-attached power tool system depicted in FIG. 6 may include any of the components discussed above with reference to the system 100 (FIG. 1). For ease of illustration, only a small number of such components are shown in FIG. 6.

In FIG. 6, the pole-attached power tool system 600 may include a first handle 104a, a second handle 104b, the electric motor 106, and the battery 122, each disposed proximate to the first end 110a of the pole 110. The first handle 104a may be disposed between the battery 122 and the electric motor 106. The second handle 104b may be disposed between the first handle 104a and the second end 110b of the pole 110. The electric motor 106 may be disposed between the first handle 104a and the second handle 104b. The power tool 114 may be disposed proximate to the second end 110b of the pole 110. The drive member 112 may extend between the electric motor 106 and the power tool 114.

As discussed above, the length of the pole 110 may be reversibly extendable. In particular, the pole may be adjustable between multiple configurations corresponding to different lengths of the pole. This adjustment may be continuous, discrete, or a combination of both. In some embodiments, the length of the drive member between the electric motor 106 and the power tool 114 in at least one configuration may be greater than 20 inches. In some embodiments, the length of the drive member between the electric motor 106 and the power tool 114 in at least one configuration may be greater than 40 inches.

Figure 8:
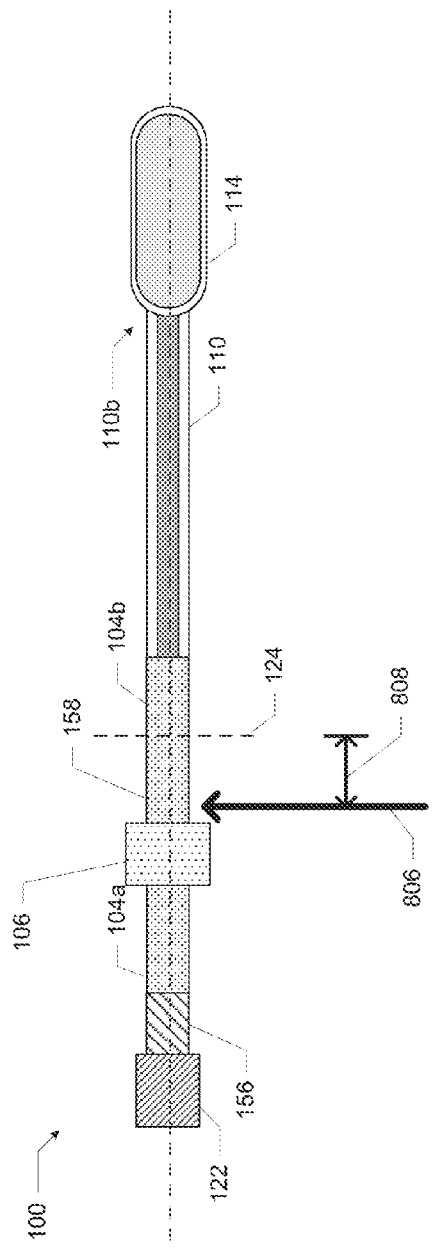

FIGS. 7-8 depict illustrative dimensions and centers of gravity of an embodiment of the pole-attached power tool system 100 (e.g., the embodiment discussed above with reference to FIG. 6) in various configurations. In particular, FIG. 7 illustrates a configuration in which the pole 110 is extended to a longer length, and FIG. 8 illustrates a configuration in which the pole 110 is retracted to a shorter length. The pole-attached power tool system 100 may be adjustable between the configurations shown in FIGS. 7 and 8 (and between any of a number of other configurations in various embodiments).

In FIG. 7, the system 100 may include the handles 104a and 104b, the electric motor 106, and the battery 122, each disposed proximate to the first end 110a of the pole 110. The power tool 114 may be disposed proximate to the second end 110b of the pole 110.

The center of gravity of the system 100 is represented by the arrow 706 and may be calculated in accordance with Eq.1, above. As shown, in some embodiments, the center of gravity 706 may be located between a mid-point of the second handle 104b (the mid-point indicated by the dotted line 124) and the first end 110a of the pole 110. In some embodiments, the center of gravity 706 may be located within a distance 708 of six inches of either side of the mid-point of the second handle 104b (as measured in the direction of the longitudinal axis 130 of the pole 110). In some embodiments, the center of gravity 706 may be located within a distance 708 of three inches of either side of the mid-point of the second handle 104b. In some embodiments, the center of gravity 706 may be located within a distance 708 of two inches of either side of the mid-point of the second handle 104b.

In FIG. 8, the system 100 may include the handles 104a and 104b, the electric motor 106, and the battery 122, each disposed proximate to the first end 110a of the pole 110. The power tool 114 may be disposed proximate to the second end 110b of the pole 110. The center of gravity of the system 100 is represented by the arrow 806 and may be calculated in accordance with Eq.1, above. As shown, in some embodiments, the center of gravity 806 may be located between the first handle 104a and a mid-point of the second handle 104b (the mid-point indicated by the dotted line 124). In some embodiments, the center of gravity 806 may be located within a distance 808 of six inches of either side of the mid-point of the second handle 104b (as measured in the direction of the longitudinal axis 130 of the pole 110). In some embodiments, the center of gravity 806 may be located within a distance 808 of three inches of either side of the mid-point of the second handle 104b. In some embodiments, the center of gravity 806 may be located within a distance 808 of two inches of either side of the mid-point of the second handle 104b.

Because the system 100 may adjusted between the configurations illustrated in FIGS. 7 and 8, the user may adjust the center of gravity of the system 100 to accommodate his or her handling preferences. In particular, when the center of gravity of the system 100 is located between the handles 104a and 104b (e.g., as shown in FIG. 8), the user will generally apply an "upward" force on each of the handles 104a and 104b to balance the system 100. When the center of gravity of the system 100 is located between the handle 104b and the second end 110b of the pole 110 (e.g., as shown in FIG. 7), the user will generally apply an "upward" force on the handle 104b and a "downward" force on the handle 104a to balance the system 100. Users may wish to push "upward" or "downward" on the handle 104a(e.g., in different applications), and thus may wish to adjust the center of gravity of the system 100. In some embodiments, one or more of the components of the system 100, instead of or in addition to the pole 110, may be adjustable to vary the center of gravity of the system 100 to suit a user's preferences and the application at hand. For example, the battery 122 may be mounted in a housing that is adjustably coupled to a handle housing 158 and can be moved along the longitudinal axis 130 (e.g., using a threaded track 156) to adjust the center of gravity of the system 100.

FIG. 9 is a cross-sectional illustration of a portion 900 of an embodiment of the pole-attached power tool system 100 (FIG. 1). The portion 900 illustrates an embodiment of the relative positions of a first handle 104a, a second handle 104b, a handle housing 132, the electric motor 106, the gear box 108, and the battery 122. FIG. 6 also illustrates the switch 116, which may be operable by a user to control actuation of a power tool (not shown) disposed at the end of the pole 110. Electrical connectors 618 (e.g., one or more cables) may couple the switch 116, the electric motor 106 and the battery 122. A drive member 112 may be coupled between the electric motor 106 (e.g., via the gear box 108) and the power tool (not shown).

FIG. 10 is a flow diagram illustrating a process 1000 for manufacturing a pole-attached power tool system (e.g., the system 100 of FIG. 1), in accordance with some embodiments. It may be recognized that, while the operations of the process 1000 (and all other processes disclosed herein) may be arranged in a particular order and illustrated once each, in various embodiments, one or more of the operations may be repeated, omitted or performed out of order. Any of the operations of the process 1000 may be performed in accordance with any of the embodiments of the system 100 described herein.

The process 1000 may begin at the operation 1002, in which a pole may be provided (e.g., the pole 110 of FIG. 1). The pole may have a first end, a second end, and an interior region.

At the operation 1004, a handle (e.g., the handle 104 of FIG. 1) may be provided proximate to the first end of the pole.

At the operation 1006, an electric motor (e.g., the electric motor 106 of FIG. 1) may be provided proximate to the first end of the pole.

At the operation 1008, a power tool (e.g., the power tool 114 of FIG. 1) may be provided proximate to the second end of the pole.

At the operation 1010, a drive member (e.g., the drive member 112 of FIG. 1) may be provided within the interior region. The drive member provided at the operation 1010 may be mechanically coupled with the electric motor (provided at the operation 1006) and the power tool (provided at the operation 1008) to transfer power generated by the electric motor to the power tool.

FIG. 11 is a flow diagram illustrating a process 1100 for manufacturing a pole-attached power tool system (e.g., the system 100 of FIG. 1), in accordance with some embodiments. Any of the operations of the process 1100 may be performed in accordance with any of the embodiments of the system 100 described herein.

The process 1000 may begin at the operation 1102, in which a pole may be provided (e.g., the pole 110 of FIG. 6). The pole may have a first end, a second end, and an interior region.

At the operation 1104, a first handle (e.g., the handle 104a of FIG. 6) and a second handle (e.g., the handle 104b of FIG. 6) may be provided proximate to the first end of the pole. The second handle may be provided between the first handle and the second end of the pole.

At the operation 1106, an electric motor (e.g., the electric motor 106 of FIG. 6) may be provided between the first and second handles.

At the operation 1108, a power tool (e.g., the power tool 114 of FIG. 6) may be provided proximate to the second end of the pole.

At the operation 1110, a drive member (e.g., the drive member 112 of FIG. 6) may be provided within the interior region. The drive member provided at the operation 1110 may be mechanically coupled with the electric motor (provided at the operation 1106) and the power tool (provided at the operation 1108) to transfer power generated by the electric motor to the power tool.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope.

Those with skill in the art will readily appreciate that embodiments may be implemented in a very wide variety of ways. This application is intended to cover any adaptations or variations of the embodiments discussed herein.

What is claimed is:

1. A pole-attached power tool system, comprising:
a pole having a first end, a second end, and an interior region, wherein a longitudinal axis of the pole defines a longitudinal direction;
a battery disposed at a first end of the pole-attached power tool system;
a first handle disposed proximate to the first end of the pole and having a first gripping region;
a second handle, disposed proximate to the first end of the pole and between the first handle and the second end of the pole, having a second gripping region;
an electric motor disposed between the first gripping region and the second gripping region in the longitudinal direction;
a power tool disposed proximate to the second end of the pole and opposite the battery;
a gear box, disposed between the first and second handles in the longitudinal direction; and
a drive member disposed within the interior region, the drive member mechanically coupled with the electric motor and the power tool to transfer power generated by the electric motor to the power tool, and
wherein the pole has a length that is adjustable, and a center of gravity of the pole-attached power tool system is located between the first handle and a mid-point of the second handle when the pole is retracted to a shorter length, or wherein the center of gravity of the pole-attached power tool system is located between the mid-point of the second handle and the first end of the pole when the is extended to a longer length.

2. The pole-attached power tool system of claim 1, wherein the pole-attached power tool system is adjustable between multiple configurations corresponding to different lengths of the pole and different distances between one or more components of the pole-attached power tool system, and wherein the center of gravity of the pole-attached power tool system is located between the first handle and a mid-point of the second handle when the pole is in a first configuration.

3. The pole-attached power tool system of claim 2, wherein when the center of gravity of the pole-attached power tool system is located between the mid-point of the second handle and the first end of the pole, the center of gravity is within six inches of the mid-point of the second handle, when the pole is in a second configuration different from the first configuration.

4. The pole-attached power tool system of claim 1, wherein the battery is electrically coupled to the electric motor.

5. The pole-attached power tool system of claim 4, wherein the first handle is disposed between the battery and the electric motor in the longitudinal direction.

6. The pole-attached power tool system of claim 4, wherein the battery provides at least 20 ampere-hours of power at 40 volts.

7. The pole-attached power tool system of claim 1, wherein the drive member has a length greater than approximately 20 inches.

8. The pole-attached power tool system of claim 1, wherein the drive member has a length greater than approximately 40 inches.

9. The pole-attached power tool system of claim 1, wherein the drive member extends through an interior of the second gripping region.

10. The pole-attached power tool system of claim 1, wherein the first handle includes a trigger operable to commence actuation of the power tool.

11. A pole-attached power tool system, comprising:
a first end and a second end, wherein the first end opposes the second end, and wherein the pole-attached power tool system includes, positioned along a longitudinal length of the pole-attached power tool system, in succession, from the first end to the second end,
a battery disposed at the first end,
a first handle,
an electric motor,
a gear box,
a second handle,
a pole,
a drive member, and
a power tool disposed at the second end, and
wherein the drive member is mechanically coupled with the electric motor and the power tool to transfer power generated by the electric motor to the power tool, and
wherein the pole has a length that is adjustable, and the battery, the first handle, the electric motor, the gear box, the second handle, and the power tool are positioned along the longitudinal length such that a center of gravity of the pole-attached power tool system is located between the first handle and a mid-point of the second handle when the pole is retracted to a shorter length or such that the center of gravity of the pole-attached power tool system is located between the mid-point of the second handle and the an end of the pole that is opposite to the power tool when the pole is extended to a longer length.

12. The pole-attached power tool system of claim 11, wherein each of the battery, the first handle, the electric motor, the gear box, and the second handle are positioned closer to the first end than the second end, and the length of the pole is adjustable so that a center of gravity of the pole-attached power tool system is located between a mid-point of the second handle and the second end.

13. The pole-attached power tool system of claim 11, wherein the first handle includes a trigger operable to commence actuation of the power tool.

14. A method for manufacturing a pole-attached power tool system, comprising:
providing a first handle and a second handle proximate to a first end of a pole, wherein:
the first handle has a first gripping region,
the second handle has a second gripping region,
the second gripping region is provided between the first gripping region and a second end of the pole, and
a longitudinal axis of the pole defines a longitudinal direction;
providing a battery at a first end of the pole-attached power tool system;
providing an electric motor between the first gripping region and the second gripping region in the longitudinal direction wherein the first handle is provided between the battery and the electric motor;
providing a power tool proximate to the second end of the pole and opposite the battery;
providing a gear box between the first and second handles in the longitudinal direction; and
providing a drive member within an interior region of the pole, wherein the drive member is mechanically coupled with the electric motor and the power tool to transfer power generated by the electric motor to the power tool, and
providing the pole having an adjustable length such that a center of gravity of the pole-attached power tool system is located between the first handle and a mid-point of the second handle when the pole is retracted to a shorter length or such that the center of gravity of the pole-attached power tool system is located between the mid-point of the second handle and the first end of the pole when the pole is extended to a longer length.

15. The method of claim 14, further comprising providing the pole so that it is adjustable between multiple configurations corresponding to different lengths of the pole.

16. The method of claim 14, further comprising providing the center of gravity of the pole-attached power tool system within a distance of approximately 6 inches of a midpoint of the second handle.

17. The method of claim 14, further comprising providing the center of gravity of the pole-attached power tool system within a distance of approximately 3 inches of a midpoint of the second handle.

18. The method of claim 14, further comprising providing the pole so that it is adjustable between multiple configurations corresponding to different lengths of the pole, wherein a first configuration of the pole has the center of gravity of the pole-attached power tool system located between the first handle and the second handle, and wherein a second configuration of the pole corresponds to the center of gravity of the pole-attached power tool system located between the second handle and the power tool.

19. The method of claim 14, further comprising providing the battery to power the electric motor.

20. The method of claim 14, further comprising providing the first handle and the second handle in a common handle housing.

21. The method of claim 14, further comprising providing the drive member to extend through an interior of the second gripping region.

* * * * *